(12) United States Patent
Jeon et al.

(10) Patent No.: US 10,397,877 B2
(45) Date of Patent: Aug. 27, 2019

(54) ELECTRONIC DEVICE AND TRANSMISSION POWER CONTROLLING METHOD

(71) Applicant: SAMSUNG ELECTRONICS CO., LTD., Suwon-si, Gyeonggi-do (KR)

(72) Inventors: Jae Woong Jeon, Suwon-si (KR); Dong Hun Park, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/933,770

(22) Filed: Mar. 23, 2018

(65) Prior Publication Data

US 2018/0288707 A1   Oct. 4, 2018

(30) Foreign Application Priority Data

Mar. 28, 2017 (KR) .................. 10-2017-0039556

(51) Int. Cl.
| | | |
|---|---|---|
| *H04W 52/04* | (2009.01) | |
| *H02J 50/80* | (2016.01) | |
| *H04W 52/34* | (2009.01) | |
| *H04W 52/36* | (2009.01) | |
| *H04W 52/38* | (2009.01) | |

(52) U.S. Cl.
CPC ............ *H04W 52/04* (2013.01); *H02J 50/80* (2016.02); *H04W 52/346* (2013.01); *H04W 52/367* (2013.01); *H04W 52/38* (2013.01)

(58) Field of Classification Search
CPC ..... H02J 50/80; H04W 52/04; H04W 52/346; H04W 52/367; H04W 52/38
USPC ... 455/69, 522, 574, 161.1, 103, 502, 435.2, 455/41.1, 41.2; 370/252, 328; 375/295, 375/373
See application file for complete search history.

(56) References Cited

U.S. PATENT DOCUMENTS

| 9,107,169 B2 | 8/2015 | Kwun et al. | |
|---|---|---|---|
| 9,929,763 B1* | 3/2018 | Zheng | .................. H04B 1/3838 |
| 2007/0054680 A1* | 3/2007 | Mo | ..................... H04B 1/71632 |
| | | | 455/502 |
| 2009/0068969 A1* | 3/2009 | Lindoff | .................. H04W 48/18 |
| | | | 455/161.1 |
| 2009/0082017 A1* | 3/2009 | Chang | .................... H04B 1/406 |
| | | | 455/435.2 |

(Continued)

FOREIGN PATENT DOCUMENTS

EP          2 403 302          1/2012

OTHER PUBLICATIONS

European Search Report for EP Application No. 18163134.2 dated Aug. 1, 2018.

*Primary Examiner* — Tan H Trinh
(74) *Attorney, Agent, or Firm* — Nixon & Vanderhye P.C.

(57) ABSTRACT

An electronic device includes at least one antenna, a Wi-Fi module including a plurality of processing circuits performing communication using the at least one antenna, and a processor configured to determine whether the Wi-Fi module is simultaneously operating in a plurality of frequency bands, to obtain a number of processing circuits that are operating in the Wi-Fi module if the Wi-Fi module is simultaneously operating in the plurality of frequency bands, and to reduce a transmission power level of the Wi-Fi module based on the number of processing circuits that are operating.

20 Claims, 7 Drawing Sheets

(56) References Cited

U.S. PATENT DOCUMENTS

| | | | | |
|---|---|---|---|---|
| 2010/0040184 A1* | 2/2010 | Haralabidis | H04B 1/0475 | 375/373 |
| 2010/0216524 A1* | 8/2010 | Thomas | H04W 52/0264 | 455/574 |
| 2011/0127845 A1* | 6/2011 | Walley | H02J 5/005 | 307/104 |
| 2011/0130093 A1* | 6/2011 | Walley | G06K 7/10207 | 455/41.1 |
| 2011/0319123 A1 | 12/2011 | Kwun et al. | | |
| 2012/0302283 A1* | 11/2012 | Sun | H04B 1/44 | 455/552.1 |
| 2012/0309332 A1* | 12/2012 | Liao | H04B 1/005 | 455/103 |
| 2013/0090142 A1* | 4/2013 | Lee | H04B 1/0475 | 455/501 |
| 2013/0176891 A1* | 7/2013 | Lee | H04W 24/10 | 370/252 |
| 2013/0267284 A1* | 10/2013 | Ryu | H04W 88/06 | 455/575.7 |
| 2013/0301537 A1* | 11/2013 | Lee | H04W 24/10 | 370/328 |
| 2014/0063345 A1* | 3/2014 | Chen | H04N 21/42638 | 348/552 |
| 2014/0161035 A1* | 6/2014 | Yoshida | H04W 88/06 | 370/328 |
| 2014/0247742 A1* | 9/2014 | Lee | H04W 52/0216 | 370/252 |
| 2014/0327587 A1* | 11/2014 | Won | H01Q 5/335 | 343/720 |
| 2015/0031408 A1 | 1/2015 | Kalla et al. | | |
| 2015/0131613 A1* | 5/2015 | Jung | H04W 24/10 | 370/331 |
| 2015/0188617 A1* | 7/2015 | Kuo | H04B 7/0602 | 375/295 |
| 2015/0296460 A1* | 10/2015 | Lee | H04B 1/3838 | 455/522 |
| 2016/0248276 A1* | 8/2016 | Hong | H02J 50/10 | |
| 2017/0019865 A1 | 1/2017 | Wang et al. | | |
| 2017/0064650 A1 | 3/2017 | Sugumar et al. | | |
| 2017/0134057 A1* | 5/2017 | Kim | H03F 3/195 | |
| 2017/0230123 A1* | 8/2017 | Lagnado | H04B 17/102 | |
| 2017/0245317 A1* | 8/2017 | Lee | H04W 76/28 | |
| 2017/0303254 A1* | 10/2017 | Kang | H04W 52/06 | |
| 2018/0063031 A1* | 3/2018 | Wloczysiak | H04B 1/0057 | |
| 2018/0067558 A1* | 3/2018 | Eagleman | G08B 1/08 | |
| 2018/0123757 A1* | 5/2018 | Ko | H04L 27/18 | |
| 2018/0241369 A1* | 8/2018 | Ghim | H03H 7/46 | |
| 2018/0270688 A1* | 9/2018 | Jung | H04J 11/00 | |
| 2018/0351237 A1* | 12/2018 | Muhn | H03K 17/96 | |

* cited by examiner

ELECTRONIC DEVICE AND TRANSMISSION POWER CONTROLLING METHOD

CROSS-REFERENCE TO RELATED APPLICATION

This application is based on and claims priority under 35 U.S.C. § 119 to Korean Patent Application No. 10-2017-0039556, filed on Mar. 28, 2017, in the Korean Intellectual Property Office, the disclosure of which is incorporated by reference herein in its entirety.

BACKGROUND

Field

The present disclosure relates to a transmission power controlling method of an electronic device that performs wireless communication.

Description of Related Art

With the development of electronic technologies, various electronic devices are being developed. Nowadays, portable electronic devices such as a smartphone, a tablet PC, and the like are widely used. While providing various services such as photo shooting, music playback, video playback, an e-mail service, a social networking service (SNS), and the like, the portable electronic devices are becoming smaller and lighter due to their portability.

The recently released electronic devices are supporting a number of wireless communication technologies to provide various services to a user. The wireless communication technologies may improve the portability of an electronic device. However, various types of electromagnetic waves generated in wireless communication may negatively affect the user's body. Accordingly, each country regulates electromagnetic waves so as to satisfy the standard for specific absorption rate (SAR), which is an indicator of the absorption rate of electromagnetic waves to the user's body.

For the purpose of satisfying the standard for SAR, manufacturers of electronic devices are uniformly reducing the transmit power level of a wireless communication module in certain situations (e.g., in the case of contacting with a user's body).

As the electronic device has various functions, the electronic device may simultaneously perform wireless communication in various frequency bands using various wireless communication technologies. In this case, the above-described standard may not satisfy the SAR standard. In addition, when uniformly reducing the transmission power level regardless of the state of the electronic device, the function of the electronic device may deteriorate by excessively limiting the transmission power.

SUMMARY

Example embodiments disclosed in the present disclosure provide an electronic device that is capable of effectively controlling a transmission power level depending on the state of the electronic device, and a transmission power controlling method of the electronic device.

In accordance with an aspect of the present disclosure, an electronic device includes at least one antenna, a Wi-Fi module including a plurality of processing circuits configured to perform communication using the at least one antenna, and a processor configured to determine whether the Wi-Fi module is simultaneously operating in a plurality of frequency bands, to obtain the number of processing circuits that are operating in the Wi-Fi module if the Wi-Fi module is simultaneously operating in the plurality of frequency bands, and to reduce a transmission power level of the Wi-Fi module based on the number of processing circuits that are operating.

In accordance with an aspect of the present disclosure, a transmission power level controlling method of an electronic device includes determining whether a Wi-Fi module is simultaneously operating in a plurality of frequency bands, wherein the Wi-Fi module includes a plurality of processing circuits configured to perform communication using at least one antenna, obtaining the number of processing circuits that are operating in the Wi-Fi module if the Wi-Fi module is simultaneously operating in the plurality of frequency bands, and reducing a transmission power level of the Wi-Fi module based on the number of processing circuits.

According to various embodiments of the present disclosure, the transmission power level of a Wi-Fi module may be effectively controlled in consideration of the number of running cores and the state of an electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Hereinafter, various example embodiments of the present disclosure will be described with reference to accompanying drawings. Accordingly, those of ordinary skill in the art will recognize that modifications, equivalents, and/or alternatives of the various embodiments described herein can be variously made without departing from the scope and spirit of the present disclosure. With regard to description of drawings, similar elements may be marked by similar reference numerals.

Figure 1:
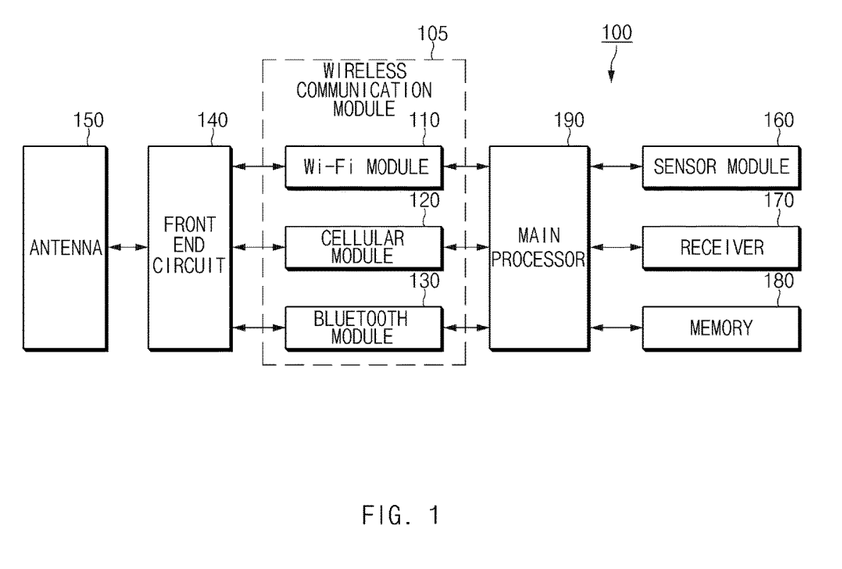
FIG. 1 is a block diagram illustrating an example configuration of an electronic device according to various embodiments of the present disclosure.

FIG. 1 is a block diagram illustrating an example configuration of an electronic device according to various embodiments of the present disclosure.

Referring to FIG. 1, an electronic device 100 may include a wireless communication module (e.g., including communication circuitry) 105, a radio frequency (RF) front end circuit 140, an antenna 150, a sensor module 160, a receiver 170, a memory 180, and a main processor (e.g., including processing circuitry) 190.

According to an embodiment, the wireless communication module 105 may include various modules including various communication circuitry, such as, for example, and without limitation, a wireless fidelity (Wi-Fi) module 110, a cellular module 120, and a Bluetooth module 130.

According to an embodiment, the Wi-Fi module 110 may communicate over a Wi-Fi network. For example, the Wi-Fi module 110 may transmit or receive data (e.g., an image, a video, or the like) to or from an external electronic device or may provide an Internet service.

According to an embodiment, the Wi-Fi module 110 may communicate using a plurality of frequency bands. For example, and without limitation, the Wi-Fi module 110 may communicate using a first frequency band (e.g., 2.4 GHz) and/or a second frequency band (e.g., 5 GHz), or the like. According to an embodiment, the Wi-Fi module 110 may support a real simultaneous dual band (RSDB). For example, the Wi-Fi module 110 may simultaneously communicate in a plurality of frequency bands. Using the antenna 150, the Wi-Fi module 110 may output first transmission power through a first frequency band and, at the same time, may output second transmission power through a second frequency band.

According to an embodiment, the cellular module 120 may communicate over a mobile communication network. For example, and without limitation, the cellular module 120 may provide a voice call, a video call, a text service, or an Internet service over a mobile communication network, or the like. According to an embodiment, the cellular module 120 may communicate using 3rd generation (3G), long term evolution (LTE), 4th generation (4G), and/or 5th generation (5G) communication technologies.

According to an embodiment, the Bluetooth module 130 may communicate with the external electronic device. For example, in a state where the Bluetooth module 130 is connected (or paired) to the external electronic device, the Bluetooth module 130 may transmit or receive data (e.g., an image, an audio, or the like).

According to an embodiment, each of the Wi-Fi module 110, the cellular module 120, and the Bluetooth module 130 may control hardware and/or software elements and may include a processor (including various processing circuitry) that performs, for example, and without limitation, data processing, calculation, or the like. For example, the processor may include a processing circuit performing data processing or calculation and/or a control circuit controlling elements.

According to various embodiments of the present disclosure, at least part (e.g., two or more) of the Wi-Fi module 110, the cellular module 120, and the Bluetooth module 130 may be included in one Integrated Circuit (IC) or an IC package.

According to an embodiment, the front end circuit 140 may include various circuitry and connect the wireless communication module 105 (e.g., the Wi-Fi module 110, the cellular module 120, and the Bluetooth module 130) to the antenna 150. According to an embodiment, the front end circuit 140 may include, for example, and without limitation, a switch. The front end circuit 140 may connect or disconnect the Wi-Fi module 110, the cellular module 120, and/or the Bluetooth module 130 to or from the antenna 150 using a switch.

According to an embodiment, the antenna 150 may transmit or receive signal (or data). According to an embodiment, the antenna 150 may include a plurality of antennas for communicating in a frequency band used by the Wi-Fi module 110, the cellular module 120, and/or the Bluetooth module 130. According to an embodiment, the antenna 150 may include a plurality of antennas that support a multiple input multiple output (MIMO) system. According to an embodiment, the antenna 150 may include a multi-band antenna. For example, the antenna 150 may include a multi-band antenna that simultaneously operates in the first frequency band (e.g., 2.4 GHz) and the second frequency band (e.g., 5 GHz).

According to an embodiment, the sensor module 160 may sense the state of the electronic device 100. According to an embodiment, the sensor module 160 may include various sensors, such as, for example, and without limitation, a proximity sensor. According to an embodiment, the proximity sensor may detect whether there is an object within a specified distance (or a location (or distance) of an object (e.g., a user's body)). For example, in the case where the user moves the electronic device near the user's face to make a call, the proximity sensor may sense that the object is present within the specified distance. According to an embodiment, the sensor module 160 may include a grip sensor. According to an embodiment, the grip sensor may sense the grip state of the electronic device 100 of the user. For example, the grip sensor may include at least one of a pressure sensor sensing the strength and/or location of the pressure by the user's grip and a touch sensor sensing the touch location by the user's grip.

According to an embodiment, the receiver 170 may include various circuitry and output audio. According to an embodiment, the receiver 170 may output a voice received from an external electronic device while a line is busy. According to an embodiment, the receiver 170 may be activated only in the case where the electronic device 100 makes a call in a proximity call mode to output a voice signal.

According to an embodiment, the electronic device 100 may further include a speaker outputting the audio in addition to the receiver 170. The speaker may output an audio signal at an output level higher than the receiver 170. For example, the speaker may be activated upon making a call in a call mode (e.g., a speaker mode) other than the proximity call mode or upon outputting the audio signal such as music.

According to an embodiment, the memory 180 may store transmission power level information (or transmission power level table) of the wireless communication module 105 (e.g., the Wi-Fi module 110). For example, the memory 180 may store the transmission power level information according to the state of the electronic device 100 in the table form. The table may include the transmission power level information in a normal state (e.g., in a state where the Wi-Fi module 110 is not simultaneously operating in a plurality of frequency bands and the electronic device 100 is not in a proximity call state) where a transmission power level is not reduced, and the transmission power level information in a backoff state where the transmission power level is reduced.

According to an embodiment, the main processor 190 (e.g., an application processor (AP)) may include various processing circuitry and control overall operations of the electronic device 100. For example, the main processor 190 may control each of the wireless communication module 105, the front end circuit 140, the antenna 150, the sensor module 160, the receiver 170, and the memory 180 to reduce the transmission power level of the wireless communication module 105 (e.g., the Wi-Fi module 110) according to various embodiments of the present disclosure. According to an embodiment, the main processor 190 may include at least one processor (e.g., a processing circuit and/or a control circuit).

According to an embodiment, the main processor 190 may activate the Wi-Fi module 110 based on a user input. Under control of the main processor 190, the Wi-Fi module 110 may store the transmission power level information stored in the memory 180, in an internal memory and may set the transmission power level of each of a plurality of cores (e.g., 111-1, 111-2, 111-3, and 111-4 in FIG. 2) based on the transmission power level information. Each of the plurality of cores (e.g., 111-1, 111-2, 111-3, and 111-4 in FIG. 2) may transmit data (or a signal) through an antenna 150 connected by the front end circuit 140, based on the set transmission power level.

According to an embodiment, the main processor 190 may verify/determine/obtain the state of the electronic device 100 and may reduce the transmission power level of the wireless communication module 105 based on the state of the electronic device 100. The main processor 190 may determine the transmission power level of the wireless communication module 105 based on the transmission power level information according to the state of the electronic device 100 stored in the memory 180. For example, the main processor 190 may set the transmission power level of the Wi-Fi module 110 to a first level in a normal state where the transmission power level is not reduced. If the Wi-Fi module 110 is simultaneously operating in a plurality of frequency bands, the main processor 190 may set the transmission power level of the Wi-Fi module 110 to a second level lower than the first level. For another example, if the Wi-Fi module 110 is simultaneously operating in a plurality of frequency bands, the electronic device 100 is in a proximity call state, and the cellular module 120 is not in operation, the main processor 190 may set the transmission power level of the Wi-Fi module 110 to a third level lower than the first level. For another example, if the Wi-Fi module 110 is simultaneously operating in the plurality of frequency bands, the electronic device 100 is in a proximity call state, and the cellular module 120 is in operation, the main processor 190 may set the transmission power level of the Wi-Fi module 110 to the third level. For another example, if the Wi-Fi module 110 is simultaneously operating in the plurality of frequency bands, the electronic device 100 is in a proximity call state, and the cellular module 120 and the Bluetooth module 130 is in operation, the main processor 190 may set the transmission power level of the Wi-Fi module 110 to the fourth level lower than the first level. For another example, if the Wi-Fi module 110 does not simultaneously operate in the plurality of frequency bands, the electronic device 100 is in a proximity call state, and the cellular module 120 is in operation, the main processor 190 may set the transmission power level of the Wi-Fi module 110 to a fifth level lower than the first level.

Figure 2:
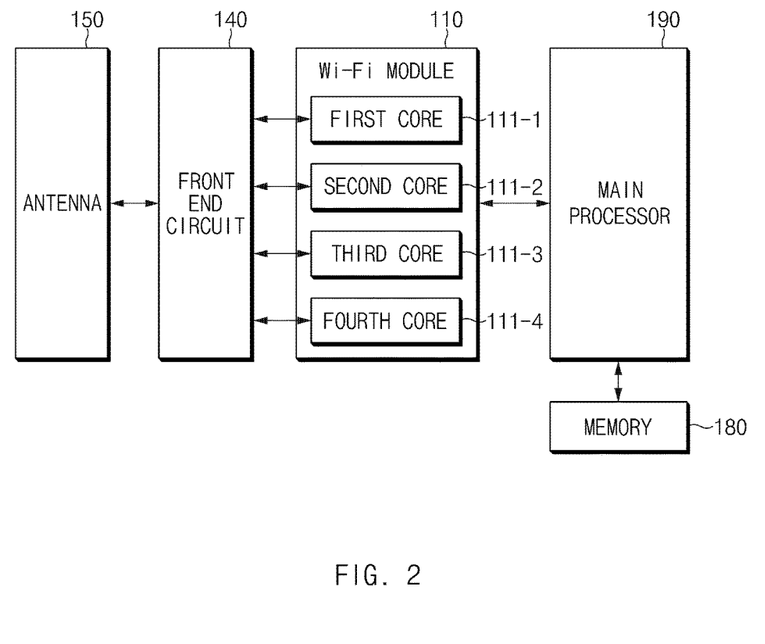
FIG. 2 is a block diagram illustrating an example configuration of a Wi-Fi module, according to various embodiments of the present disclosure.

FIG. 2 is a block diagram illustrating an example configuration of a Wi-Fi module, according to various embodiments of the present disclosure.

Referring to FIG. 2, the Wi-Fi module 110 may include a plurality of cores (or a processing circuit) (e.g., 111-1, 111-2, 111-3, and 111-4). An embodiment is described in FIG. 2 as the Wi-Fi module 110 includes four cores. However, the Wi-Fi module 110 is not limited thereto and may include a large number (e.g., eight) of cores, the number of which is greater than four. Similarly, the Wi-Fi module 110 may include less than four cores. According to an embodiment, each of the plurality of cores 111-1, 111-2, 111-3, and 111-4 may process data. Each of the cores may be the basic unit of data processing, and, for example, may process data for transmitting and receiving a packet according to IEEE 802.11 or may control the operation of the Wi-Fi module 110. The Wi-Fi module 110 may simultaneously use the plurality of cores or may communicate using a part of the plurality of cores.

According to an embodiment, the main processor 190 may verify (e.g., determine or obtain) the operating state of each of the plurality of cores 111-1, 111-2, 111-3, and 111-4 included in the Wi-Fi module 110. For example, the main processor 190 may verify whether each of the plurality of cores 111-1, 111-2, 111-3, and 111-4 operates (or whether to transmit or receive data) and/or an operating frequency band of each of the plurality of cores 111-1, 111-2, 111-3, and 111-4. The main processor 190 may determine whether the Wi-Fi module 110 is simultaneously operating in a plurality of frequency bands (or whether to operate in RSDB environment), based on the operating state of each of the plurality of cores 111-1, 111-2, 111-3, and 111-4. According to another embodiment, the main processor 190 may determine whether the Wi-Fi module 110 is simultaneously operating in a plurality of frequency bands, based on an application being executed. For example, if a specified application using a plurality of frequencies is executed, the main processor 190 may determine whether the Wi-Fi module 110 is simultaneously operating in a plurality of frequency bands.

According to an embodiment, if the Wi-Fi module 110 is simultaneously operating in a plurality of frequency bands, the main processor 190 may reduce the transmission power level of the Wi-Fi module 110. For example, the main processor 190 may reduce the transmission power level of at least one of running cores.

According to an embodiment, if the Wi-Fi module 110 is simultaneously operating in a plurality of frequency bands, the main processor 190 may verify the number of cores that are operating in the Wi-Fi module 110. According to an embodiment, the number of running cores may be changed depending on an operating environment of the Wi-Fi module 110. Table 1 illustrates the number of cores that is operating depending on the operating environment of the Wi-Fi module 110.

TABLE 1

| Operating environment | The number of cores | 2.4 GHz | | 5 GHz | | Antenna | |
|---|---|---|---|---|---|---|---|
| | | Core 1 | Core 2 | Core 3 | Core 4 | ANT 1 | ANT 2 |
| 2.4 GHz SISO | 1 | ○ | | | | ○ | |
| | 1 | | ○ | | | | ○ |
| 2.4 GHz MIMO | 2 | ○ | ○ | | | ○ | ○ |
| 5 GHz SISO | 1 | | | ○ | | ○ | |
| | 1 | | | | ○ | | ○ |
| 5 GHz MIMO | 2 | | | ○ | ○ | ○ | ○ |
| 2.4 GHz + 5 GHz RSDB & SISO | 2 | ○ | | ○ | | ○ | |
| | 2 | ○ | | | ○ | ○ | ○ |
| | 2 | | ○ | ○ | | ○ | ○ |
| | 2 | | ○ | | ○ | | ○ |
| 2.4 GHz + 5 GHz RSDB & 2.4 GHz or 5 GHz MIMO | 3 | ○ | ○ | ○ | | ○ | ○ |
| | 3 | ○ | ○ | | ○ | ○ | ○ |
| | 3 | ○ | | ○ | ○ | ○ | ○ |
| | 3 | | ○ | ○ | ○ | ○ | ○ |
| 2.4 GHz + 5 GHz RSDB & MIMO | 4 | ○ | ○ | ○ | ○ | ○ | ○ |

Referring to Table 1, the number of running cores may be changed depending on an operating environment of the Wi-Fi module 110. For example, in the case where the Wi-Fi module 110 operates in RSDB and single input single output (SISO) environments, two cores may operate at the same time. For another example, in the case where the Wi-Fi module 110 operates in the RSDB environment and one of a plurality of frequency bands is used for a multiple input multiple output (MIMO) environment, three cores may operate at the same time. In the case where the Wi-Fi module 110 operates in the RSDB environment and the plurality of frequency bands is used for the MIMO environment, four cores may operate at the same time.

According to an embodiment, the main processor 190 may determine the transmission power level of the Wi-Fi module 110 depending on the number of cores that are operating in the Wi-Fi module 110. For example, the main processor 190 may reduce the transmission power level of at least one of running cores based on the number of running cores. According to an embodiment, the main processor 190 may reduce the transmission power level of the Wi-Fi module 110 depending on the transmission power level information (or a transmission power level table) stored in the memory 180. Table 2 illustrates an example of transmission power level information according to the number of running cores.

TABLE 2

| Normal | The number of cores | Decrement |
|---|---|---|
| 19 dBm | 2 | −3 dBm |
| | 3 | −4 dBm |
| | 4 | −5 dBm |

Referring to Table 2, the transmission power level information may include the transmission power level in a normal state and the decrement of transmission power level according to the number of running cores. For example, in the case where the number of cores that are operating is two, the main processor 190 may reduce the transmission power level of the running core by 3 dB compared with a normal state based on the transmission power level information; in the case where the number of running cores is three, the main processor 190 may reduce the transmission power level of the running core by 4 dB based on the transmission power level information; and in the case where the number of running cores is four, the main processor 190 may reduce the transmission power level of the running core by 5 dB based on the transmission power level information. Referring to Table 2, as the number of running cores increases, the main processor 190 may increase the decrement of the transmission power level of the Wi-Fi module 110.

According to an embodiment, the memory 180 may store different transmission power level information for respective cores (or for each operating frequency band of a core). According to an embodiment, the main processor 190 may reduce the transmission power level of each of a plurality of cores, depending on pieces of transmission power level information respectively corresponding to a plurality of cores.

According to an embodiment, the main processor 190 may verify the operating state of the cellular module 120. For example, the main processor 190 may determine whether the cellular module 120 is in operation (or whether data is transmitted and received).

According to an embodiment, the main processor 190 may verify the operating state of the Bluetooth module 130. For example, the main processor 190 may determine whether the Bluetooth module 130 is in operation (or whether the Bluetooth module 130 is connected to another electronic device or whether data is being transmitted and received).

According to an embodiment, the main processor 190 may determine whether the electronic device 100 makes a proximity call using the sensor module 160. For example, if an object (e.g., a user's body) is sensed within a specified distance by a proximity sensor and the receiver 170 is in operation, the main processor 190 may determine that a user makes a proximity call.

According to an embodiment, the main processor 190 may determine whether the electronic device 100 is gripped by the user. For example, if the pressure of the specified strength is sensed at a specified location by the grip sensor, the main processor 190 may determine that the electronic device 100 is gripped by the user.

According to an embodiment, if the Wi-Fi module 110 is simultaneously operating in a plurality of frequency bands, the main processor 190 may reduce the transmission power level of the Wi-Fi module 110, based on at least one of the above-described various pieces of state information of the electronic device 100. Table 3 illustrates an example of transmission power level information according to the operating state of the electronic device 100.

TABLE 3

| Normal | The number of cores | Cellular | Bluetooth | Proximity call (Grip) | Decrement |
|---|---|---|---|---|---|
| 19 dBm | 2 | O | O | O | −6 dBm |
|  |  |  |  | X | −4 dBm |
|  |  |  | X | O | −6 dBm |
|  |  |  |  | X | −3 dBm |
|  |  | X | O | O | −5 dBm |
|  |  |  |  | X | −3 dBm |
|  |  |  | X | O | −4 dBm |
|  |  |  |  | X | −2 dBm |
|  | 3 | O | O | O | −7 dBm |
|  |  |  |  | X | −5 dBm |
|  |  |  | X | O | −7 dBm |
|  |  |  |  | X | −4 dBm |
|  |  |  | ... |  |  |

Referring to Table 3, the transmission power level information may include the transmission power level in a normal state and the decrement of transmission power level according to the state of the electronic device 100. For example, the transmission power level information may include the decrement of transmission power level according to the number of running cores, whether a cellular module operates, whether a Bluetooth module operates, and whether the electronic device 100 is in a proximity call mode (or whether the electronic device 100 is gripped).

Figure 3:
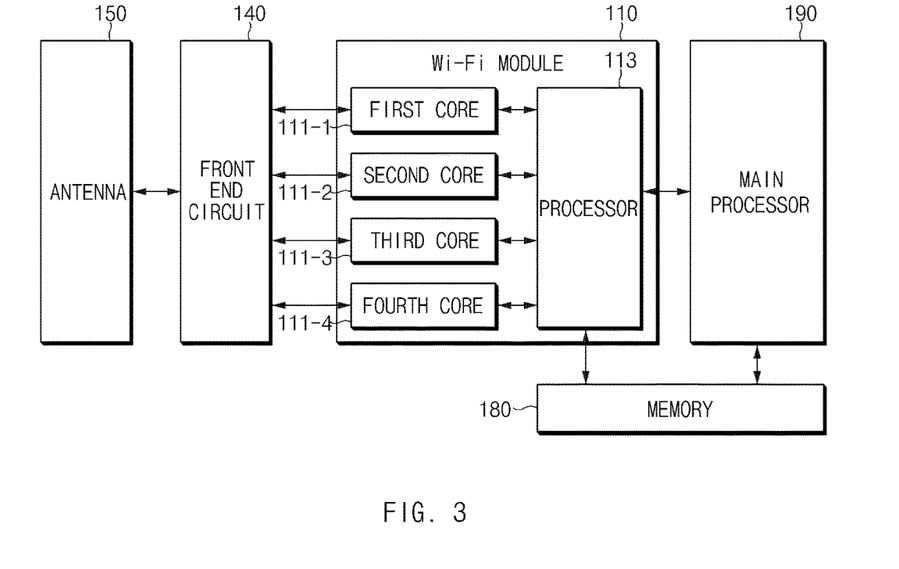
FIG. 3 is a block diagram illustrating an example configuration of a Wi-Fi module, according to various embodiments of the present disclosure.

FIG. 3 is a block diagram illustrating an example configuration of a Wi-Fi module, according to various embodiments of the present disclosure.

Referring to FIG. 3, the Wi-Fi module 110 may include a plurality of cores (e.g., a processing circuit) 111-1, 111-2, 111-3, and 111-4 and a processor (e.g., a control circuit) 113 that controls the operations of the plurality of cores 111-1, 111-2, 111-3, and 111-4. The processor 113 may be a processor that controls the operation of the Wi-Fi module 110 under control of the main processor 190. For example, in an activation (or booting) procedure, the processor 113 may store the transmission power level information stored in the memory 180, in an internal memory and may set a transmission power level of each of the plurality of cores 111-1, 111-2, 111-3, and 111-4 based on the transmission power level information.

According to an embodiment, the processor 113 may verify the operating state of each of the plurality of cores 111-1, 111-2, 111-3, and 111-4. For example, the processor 113 may verify whether each of the plurality of cores 111-1, 111-2, 111-3, and 111-4 operates (or whether to transmit or receive data) and/or an operating frequency band of each of the plurality of cores 111-1, 111-2, 111-3, and 111-4. The processor 113 may determine whether the Wi-Fi module 110 is simultaneously operating in a plurality of frequency bands (or whether the Wi-Fi module 110 operates in RSDB environment), based on the operating state of each of the plurality of cores 111-1, 111-2, 111-3, and 111-4. According to an embodiment, the processor 113 may transmit information about the operating states of the plurality of cores 111-1, 111-2, 111-3, and 111-4 to the main processor 190.

According to an embodiment, the processor 113 may perform a part of the operations of the main processor 190 described with reference to FIG. 2. If the Wi-Fi module 110 is simultaneously operating in a plurality of frequency bands, the processor 113 may reduce the transmission power level of at least one of the plurality of cores 111-1, 111-2, 111-3, and 111-4. For example, the processor 113 may reduce the transmission power level of at least one of the plurality of cores 111-1, 111-2, 111-3, and 111-4, based on the transmission power level information in Table 2.

According to an embodiment, the processor 113 may receive information about the operating state of the electronic device 100 from the main processor 190. For example, the processor 113 may receive, from the main processor 190, at least one of the operating state of the cellular module 120, the operating state of the Bluetooth module 130, call state information (e.g., information associated with a proximity call state) of a user, and grip state information.

According to an embodiment, the processor 113 may reduce the transmission power level of at least one of the plurality of cores 111-1, 111-2, 111-3, and 111-4, based on information received from the main processor 190. For example, the processor 113 may reduce the transmission power level of at least one of the plurality of cores 111-1, 111-2, 111-3, and 111-4, based on the transmission power level information in Table 3.

According to various embodiments of the present disclosure, the transmission power level of the Wi-Fi module 110 may be effectively controlled in consideration of (based on) the number of running cores and the state of the electronic device 100.

According to an embodiment of the present disclosure, the transmission power level of the Wi-Fi module 110 may, for example, be controlled using the processor 113 included in the Wi-Fi module 110, instead of the main processor 190, thereby reducing the data throughput of the main processor 190. In addition, even in the case where the main processor 190 operates in a low-power mode (e.g., a sleep mode), the mode of the main processor 190 may not be changed to an awake mode, and the transmission power level of the Wi-Fi module 110 may be controlled using the processor 113 that essentially operates in a state where the Wi-Fi module 110 is activated, thereby reducing the power consumption of the electronic device 100.

According to an embodiment described with reference to FIGS. 1 to 3, an embodiment is described as the main processor 190 is a configuration that is separate from the Wi-Fi module 110, the cellular module 120, and the Bluetooth module 130. However, according to an embodiment, the main processor 190 may be configured as an IC chip or an IC package with at least part of the Wi-Fi module 110, the cellular module 120, and the Bluetooth module 130. For example, at least part of the Wi-Fi module 110, the cellular module 120, and the Bluetooth module 130 may be placed in the main processor 190.

Figure 4:
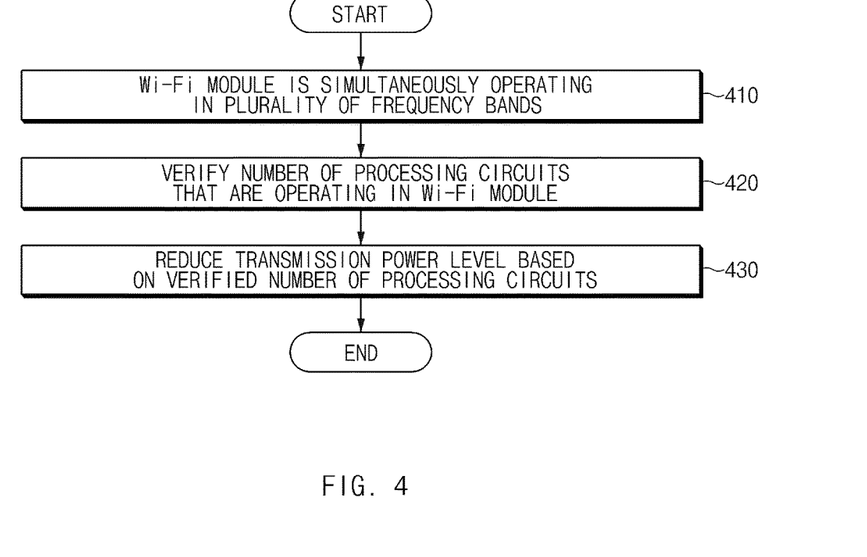
FIG. 4 is a flowchart illustrating an example transmission power level controlling method of an electronic device, according to various embodiments of the present disclosure.

FIG. 4 is a flowchart illustrating an example transmission power level controlling method of an electronic device, according to various embodiments of the present disclosure.

A flowchart illustrated in FIG. 4 may include operations which the electronic device 100 illustrated in FIG. 1 processes. Even though omitted below, details about the electronic device 100 described with reference to FIGS. 1 to 3 may be applied to the flowchart illustrated in FIG. 4.

Referring to FIG. 4, in operation 410, the electronic device 100 (e.g., the main processor 190 or the processor 113) may determine whether a Wi-Fi module is simultaneously operating in a plurality of frequency bands (or whether the Wi-Fi module operates in an RSDB environment). For example, the electronic device 100 may verify or determine whether each of a plurality of cores included in the Wi-Fi module operates (or whether to transmit or receive data) and/or an operation frequency band of each of the plurality of cores. The electronic device 100 may determine whether the Wi-Fi module is simultaneously operating in the plurality of frequency bands, based on the operating state of each of the plurality of cores. For another example, the electronic device 100 may determine whether the Wi-Fi module is simultaneously operating in the plurality of frequency bands, based on an application being executed.

According to an embodiment, if the Wi-Fi module is simultaneously operating in the plurality of frequency bands, in operation 420, the electronic device 100 (e.g., the main processor 190 or the processor 113) may verify or obtain the number of processing circuits (or cores) that are operating in the Wi-Fi module.

According to an embodiment, in operation 430, the electronic device 100 (e.g., the main processor 190 or the processor 113) may reduce the transmission power level of the Wi-Fi module based on the number of processing circuits that are operating in the Wi-Fi module. According to an embodiment, the electronic device 100 may reduce the transmission power level of the Wi-Fi module depending on the transmission power level information (or a transmission power level table) stored in a memory. For example, the electronic device 100 may control the transmission power level of each of the plurality of processing circuits included in the Wi-Fi module, based on one piece of transmission power level information. According to another embodiment, the electronic device 100 may control the transmission power level of each of a plurality of processing circuits, depending on pieces of transmission power level information respectively corresponding to the plurality of processing circuits.

According to an embodiment, as the number of processing circuits that are operating in the Wi-Fi module increases, the electronic device 100 may increase the decrement of the transmission power level of the Wi-Fi module.

Figure 5:
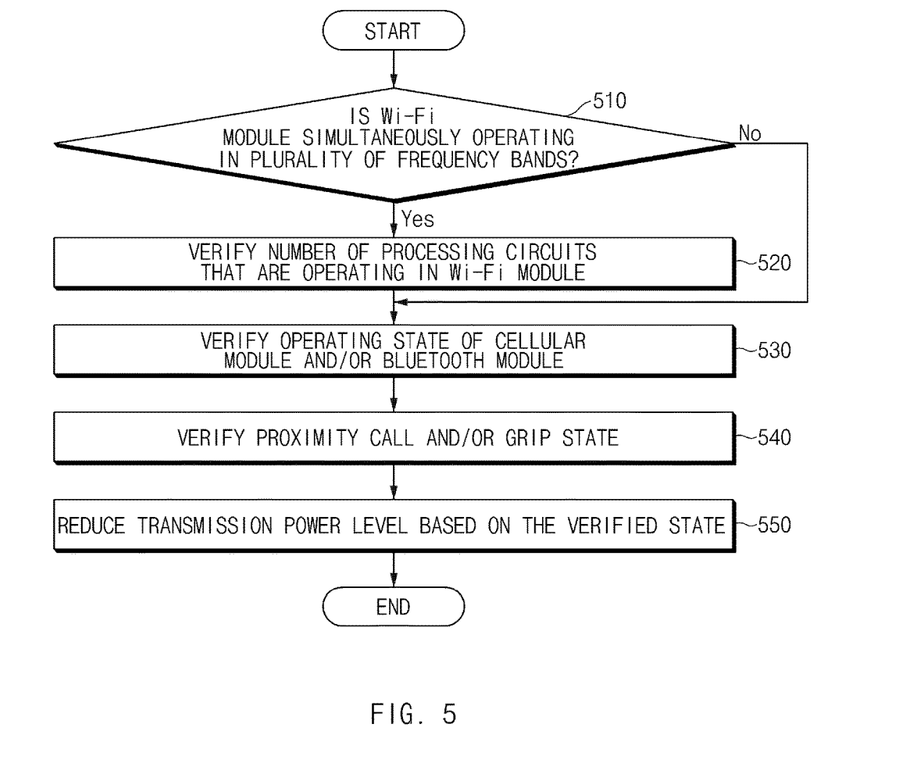
FIG. 5 is a flowchart illustrating an example transmission power level controlling method of an electronic device, according to various embodiments of the present disclosure.

FIG. 5 is a flowchart illustrating an example transmission power level controlling method of an electronic device, according to various embodiments of the present disclosure.

A flowchart illustrated in FIG. 5 may include operations which the electronic device 100 illustrated in FIG. 1 processes. Even though omitted below, details about the electronic device 100 described with reference to FIGS. 1 to 3 may be applied to the flowchart illustrated in FIG. 5.

Referring to FIG. 5, in operation 510, the electronic device 100 (e.g., the main processor 190 or the processor 113) may determine whether a Wi-Fi module is simultaneously operating in a plurality of frequency bands (or whether the Wi-Fi module operates in an RSDB environment). For example, the electronic device 100 may verify or determine whether each of a plurality of cores included in the Wi-Fi module operates (or whether to transmit or receive data) and/or an operation frequency band of each of a plurality of cores. The electronic device 100 may determine whether the Wi-Fi module is simultaneously operating in the plurality of frequency bands, based on the operating state of each of the plurality of cores. For another example, the electronic device 100 may determine whether the Wi-Fi module is simultaneously operating in the plurality of frequency bands, based on an application being executed.

According to an embodiment, if the Wi-Fi module is simultaneously operating in the plurality of frequency bands, in operation 520, the electronic device 100 (e.g., the main processor 190 or the processor 113) may verify/obtain the number of processing circuits (e.g., cores) that are operating in the Wi-Fi module.

According to an embodiment, in operation 530, the electronic device 100 (e.g., the main processor 190) may verify or obtain the operating state of at least one of a cellular module and a Bluetooth module.

According to an embodiment, in operation 540, the electronic device 100 (e.g., the main processor 190) may determine whether the electronic device 100 is in a proximity call mode and/or whether the electronic device 100 is gripped by a user. For example, if an object (e.g., the user's body) is sensed within a specified distance by a proximity sensor and a receiver is in operation, the electronic device 100 may determine that a user makes a proximity call. For another example, if the pressure of the specified strength is sensed at a specified location by the grip sensor, the electronic device 100 may determine that the electronic device 100 is gripped by the user.

According to an embodiment, in operation 550, the electronic device 100 (e.g., the main processor 190 or the processor 113) may reduce the transmission power level of the wireless communication module 105, based on at least one of the state information of the electronic device 100. For example, the electronic device 100 may set the transmission power level of the Wi-Fi module 110 to a first level in a normal state where the transmission power level is not reduced. If the Wi-Fi module 110 is simultaneously operating in a plurality of frequency bands, the electronic device 100 may set the transmission power level of the Wi-Fi module 110 to a second level lower than the first level. For another example, if the Wi-Fi module 110 is simultaneously operating in a plurality of frequency bands, the electronic device 100 is in a proximity call state, and the cellular module 120 is not in operation, the electronic device 100 may set the transmission power level of the Wi-Fi module 110 to a third level lower than the first level. For another example, if the Wi-Fi module 110 is simultaneously operating in the plurality of frequency bands, the electronic device 100 is in a proximity call state, and the cellular module 120 is in operation, the electronic device 100 may set the transmission power level of the Wi-Fi module 110 to the third level. For another example, if the Wi-Fi module 110 is simultaneously operating in the plurality of frequency bands, the electronic device 100 is in a proximity call state, and the cellular module 120 and the Bluetooth module 130 is in operation, the electronic device 100 may set the transmission power level of the Wi-Fi module 110 to the fourth level lower than the first level. For another example, if the Wi-Fi module 110 is not simultaneously operating in the plurality of frequency bands, the electronic device 100 is in a proximity call state, and the cellular module 120 is in operation, the electronic device 100 may set the transmission power level of the Wi-Fi module 110 to a fifth level lower than the first level.

According to various embodiments, operation 510 to operation 540 may be performed regardless of an order. For example, operation 510 to operation 540 may be performed at the same time or may be performed depending on an order different from the order of FIG. 5.

Figure 6:
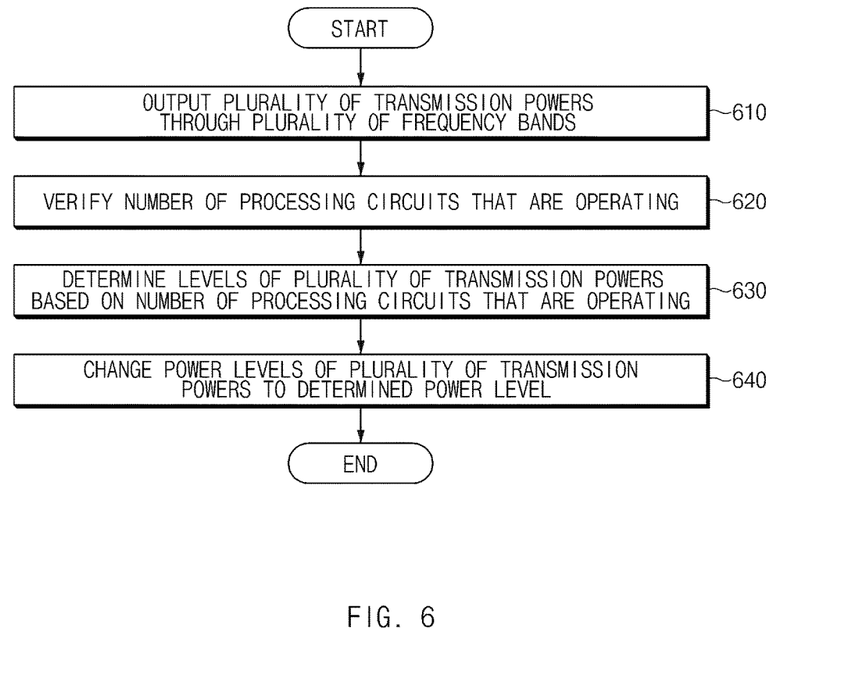
FIG. 6 is a flowchart illustrating an example transmission power level controlling method of an electronic device, according to various embodiments of the present disclosure.

FIG. 6 is a flowchart illustrating an example transmission power level controlling method of an electronic device, according to various embodiments of the present disclosure.

A flowchart illustrated in FIG. 6 may include operations which the electronic device 100 illustrated in FIG. 1 processes. Even though omitted below, details about the electronic device 100 described with reference to FIGS. 1 to 3 may be applied to the flowchart illustrated in FIG. 6.

Referring to FIG. 6, in operation 610, the electronic device 100 (e.g., the main processor 190 or the processor 113) may determine whether a wireless communication module (e.g., the Wi-Fi module 110) outputs a plurality of transmission powers through a plurality of frequency bands, or may determine whether the wireless communication module is simultaneously operating in a plurality of frequency bands (or whether to operate in an RSDB environment). For example, using one or more antennas, the electronic device 100 may determine whether the wireless communication module outputs first transmission power through a first frequency band and outputs second transmission power through a second frequency band.

According to an embodiment, if the wireless communication module (e.g., the Wi-Fi module 110) outputs a plurality of transmission powers through a plurality of frequency bands, in operation 620, the electronic device 100 (e.g., the main processor 190 or the processor 113) may verify/obtain the number of processing circuits (e.g., cores) that are operating in the wireless communication module.

According to an embodiment, in operation 630, the electronic device 100 (e.g., the main processor 190 or the processor 113) may determine the power level of each of a plurality of transmission powers of the wireless communication module, based on the number of processing circuits (or cores) that are operating in the wireless communication module (e.g., the Wi-Fi module 110). For example, the electronic device 100 may determine the power level of the first transmission power as a first level and may determine the power level of the second transmission power as a second level. According to an embodiment, the electronic device 100 may determine the power level of each of the plurality of transmission powers depending on the transmission power level information (or a transmission power level table) stored in a memory. For example, the electronic device 100 may determine the transmission power level of the plurality of processing circuits based on one piece of transmission power level information or may determine the transmission power level of each of the plurality of processing circuits depending on pieces of transmission power level information respectively corresponding to the plurality of processing circuits. According to an embodiment, as the number of processing circuits that are operating in a module increases, the electronic device 100 may set the transmission power level of the wireless communication module to be low.

According to an embodiment, in operation 640, the electronic device 100 (e.g., the main processor 190 or the processor 113) may change the power level of each of the plurality of transmission powers to the determined power level. For example, the electronic device 100 may output the plurality of transmission powers depending on the power level determined in operation 630.

Figure 7:
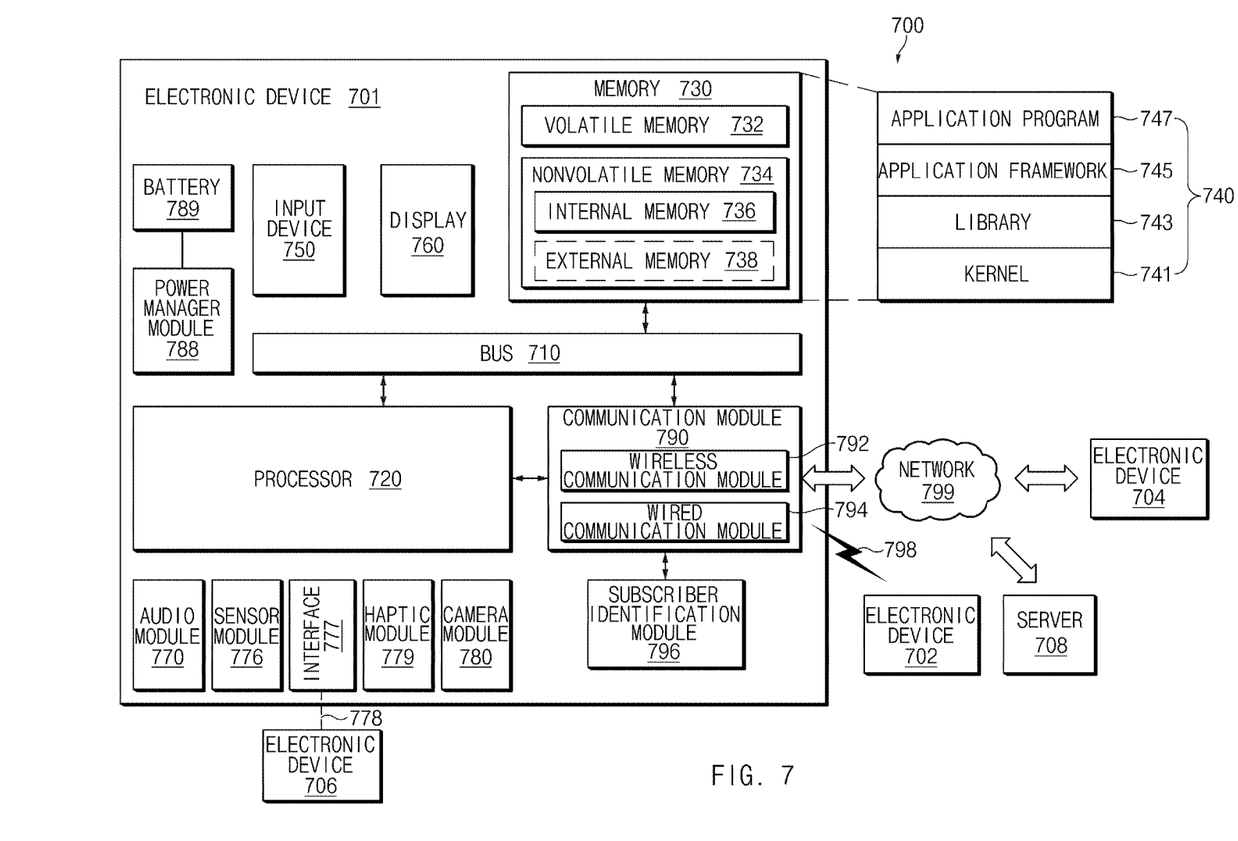
FIG. 7 is a block diagram illustrating an electronic device in a network environment, according to various embodiments.

FIG. 7 is a block diagram illustrating an electronic device in a network environment, according to various embodiments.

According to various embodiments disclosed in the present disclosure, the electronic device 701 may include various types of devices. For example, the electronic device 701 may include, for example, and without limitation, at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device, or the like, but is not limited thereto. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit, or the like, but is not limited thereto. According to embodiments, the electronic device may include at least one of, for example, televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame, or the like, but is not limited thereto.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp), or the like, but is not limited thereto. According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the present disclosure, the term "user" used herein may refer to a person who uses the electronic device or may refer to a device (e.g., an artificial intelligence electronic device) that uses the electronic device.

In the network environment 700 given with reference to FIG. 7, the electronic device 701 (e.g., an electronic device 100) may communicate with a first external electronic device 702 through local wireless communication 798 or may communication with a second external electronic device 704 or a server 708 through a network 799. According to an embodiment, the electronic device 701 may communicate with the electronic device 704 through the server 708.

According to an embodiment, the electronic device 701 may include a bus 710, a processor (e.g., including processing circuitry) 720 (e.g., the main processor 190), a memory 730, an input device 750 (e.g., including input circuitry, such as, for example, and without limitation, a microphone or a mouse), a display 760, an audio module (e.g., including audio circuitry) 770, a sensor module 776, an interface (e.g., including interface circuitry) 777, a haptic module (e.g., including haptic circuitry) 779, a camera module 780, a power management module 788, a battery 789, a communication module (e.g., including communication circuitry) 790, and a subscriber identification module 796. According to an embodiment, the electronic device 701 may not include at least one (e.g., the display 760 or the camera module 780) of the above-described elements or may further include other element(s).

For example, the bus 710 may interconnect the above-described elements 720 to 790 and may include a circuit for conveying signals (e.g., a control message or data) between the above-described elements.

The processor 720 may include various processing circuitry, such as, for example, and without limitation, one or more of a dedicated processor, a central processing unit (CPU), an application processor (AP), a graphic processing unit (GPU), an image signal processor (ISP) of a camera or a communication processor (CP), or the like. According to an embodiment, the processor 720 may be implemented with a system on chip (SoC) or a system in package (SiP). For example, the processor 720 may drive an operating system (OS) or an application to control at least one of another element (e.g., hardware or software element) connected to the processor 720 and may process and compute various data. The processor 720 may load an instruction or data, which is received from at least one of other elements (e.g., the communication module 790), into a volatile memory 732 to process the instruction or data and may store the process result data into a nonvolatile memory 734.

The memory 730 may include, for example, the volatile memory 732 and/or the nonvolatile memory 734. The volatile memory 732 may include, for example, a random access memory (RANI) (e.g., a dynamic RAM (DRAM), a static RAM (SRAM), or a synchronous dynamic RAM (SDRAM)). The nonvolatile memory 734 may include, for example, an one time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 734 may be configured in the form of an internal memory 736 and/or the form of an external memory 738 which is available through connection only if necessary, according to the connection with the electronic device 701. The external memory 738 may further include a flash drive such as compact flash (CF), secure digital (SD), micro secure digital (Micro-SD), mini secure digital (Mini-SD), extreme digital (xD), a multimedia card (MMC), or a memory stick. The external memory 738 may be operatively or physically connected with the electronic device 701 in a wired manner (e.g., a cable or a universal serial bus (USB)) or a wireless (e.g., Bluetooth) manner.

For example, the memory 730 may store, for example, at least one different software element, such as an instruction or data associated with the program 740, of the electronic device 701. The program 740 may include, for example, a kernel 741, a library 743, an application framework 745 or an application program (interchangeably, "application") 747.

The input device 750 may include various input circuitry, such as, for example, and without limitation, a microphone, a mouse, or a keyboard. According to an embodiment, the keyboard may include a keyboard physically connected or a keyboard virtually displayed through the display 760.

The display 760 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display, or the like, but is not limited thereto. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light.

The projector may project light onto a screen to display an image. The screen may be located inside or outside the electronic device 701.

The audio module 770 may include various audio circuitry and convert, for example, from a sound into an electrical signal or from an electrical signal into the sound. According to an embodiment, the audio module 770 may acquire sound through the input device 750 (e.g., a microphone) or may output sound through an output device (not illustrated) (e.g., a speaker or a receiver) included in the electronic device 701, an external electronic device (e.g., the electronic device 702 (e.g., a wireless speaker or a wireless headphone)) or an electronic device 706 (e.g., a wired speaker or a wired headphone) connected with the electronic device 701

The sensor module 776 may measure or detect, for example, an internal operating state (e.g., power or temperature) or an external environment state (e.g., an altitude, a humidity, or brightness) of the electronic device 701 to generate an electrical signal or a data value corresponding to the information of the measured state or the detected state. The sensor module 776 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 776 may further include a control circuit for controlling at least one or more sensors included therein. According to an embodiment, the sensor module 776 may be controlled using the processor 720 or a processor (e.g., a sensor hub) separate from the processor 720. In the case that the separate processor (e.g., a sensor hub) is used, while the processor 720 is in a sleep state, the separate processor may operate without awakening the processor 720 to control at least a portion of the operation or the state of the sensor module 776.

According to an embodiment, the interface 777 may include various interface circuitry, such as, for example, and without limitation, a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface, or the like. A connector 778 may physically connect the electronic device 701 and the electronic device 706. According to an embodiment, the connector 778 may include, for example, an USB connector, an SD card/MMC connector, or an audio connector (e.g., a headphone connector).

The haptic module 779 may include various haptic circuitry and convert an electrical signal into mechanical stimulation (e.g., vibration or motion) or into electrical stimulation. For example, the haptic module 779 may apply tactile or kinesthetic stimulation to a user. The haptic module 779 may include, for example, a motor, a piezoelectric element, or an electric stimulator.

The camera module 780 may capture, for example, a still image and a moving picture. According to an embodiment, the camera module 780 may include at least one lens (e.g., a wide-angle lens and a telephoto lens, or a front lens and a rear lens), an image sensor, an image signal processor, or a flash (e.g., a light emitting diode or a xenon lamp).

The power management module 788, which is to manage the power of the electronic device 701, may constitute at least a portion of a power management integrated circuit (PMIC).

The battery 789 may include a primary cell, a secondary cell, or a fuel cell and may be recharged by an external power source to supply power at least one element of the electronic device 701.

The communication module 790 may include various communication circuitry and establish a communication channel between the electronic device 701 and an external device (e.g., the first external electronic device 702, the second external electronic device 704, or the server 708). The communication module 790 may support wired communication or wireless communication through the established communication channel. According to an embodiment, the communication module 790 may include a wireless communication module 792 or a wired communication module 794. The communication module 790 may communicate with the external device (e.g., the first external electronic device 702, the second external electronic device 704 or the server 708) through a first network 798 (e.g. a wireless local area network such as Bluetooth or infrared data association (IrDA)) or a second network 799 (e.g., a wireless wide area network such as a cellular network) through a relevant module among the wireless communication module 792 or the wired communication module 794.

The wireless communication module 792 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity, Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 792 supports cellular communication, the wireless communication module 792 may, for example, identify or authenticate the electronic device 701 within a communication network using the subscriber identification module (e.g., a SIM card) 796. According to an embodiment, the wireless communication module 792 may include a communication processor (CP) separate from the processor 2820 (e.g., an application processor (AP). In this case, the communication processor may perform at least a portion of functions associated with at least one of elements 710 to 796 of the electronic device 701 in substitute for the processor 720 when the processor 720 is in an inactive (sleep) state, and together with the processor 720 when the processor 720 is in an active state. According to an embodiment, the wireless communication module 792 may include a plurality of communication modules, each supporting only a relevant communication scheme among cellular communication, short-range wireless communication, or a GNSS communication scheme.

The wired communication module 794 may include, for example, include a local area network (LAN) service, a power line communication, or a plain old telephone service (POTS).

For example, the first network 798 may employ, for example, Wi-Fi direct or Bluetooth for transmitting or receiving instructions or data through wireless direct connection between the electronic device 701 and the first external electronic device 702. The second network 799 may include a telecommunication network (e.g., a computer network such as a LAN or a WAN, the Internet or a telephone network) for transmitting or receiving instructions or data between the electronic device 701 and the second electronic device 704.

According to embodiments, the instructions or the data may be transmitted or received between the electronic device 701 and the second external electronic device 704 through the server 708 connected with the second network. Each of the external first and second external electronic devices 702 and 704 may be a device of which the type is different from or the same as that of the electronic device 701. According to various embodiments, all or a part of operations that the electronic device 701 will perform may be executed by another or a plurality of electronic devices (e.g., the first external electronic device 702, the second external electronic device 704 or the server 708). According to an embodiment, in the case that the electronic device 701 executes any function or service automatically or in response to a request, the electronic device 701 may not perform the function or the service internally, but may alternatively or additionally transmit requests for at least a part of a function associated with the electronic device 701 to any other device (e.g., the electronic device 702 or 704 or the server 708). The other electronic device (e.g., the electronic device 702 or 704 or the server 708) may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modifications, equivalents, and/or alternatives of the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may refer to a situation in which the device is "capable of" operating together with another device or other components. For example, a "processor configured to (or set to) perform A, B, and C" may refer, for example, and without limitation, to a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 830).

The term "module" used herein may include a unit, which is implemented with hardware, software, and/or firmware or any combination thereof, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, and without limitation, a dedicated processor, a CPU, an application-specific IC (ASIC) chip, a field-programmable gate array (FPGA), and a programmable-logic device for performing some operations, or the like, which are known or will be developed.

According to various embodiments, at least a part of an apparatus (e.g., modules or functions thereof) or a method (e.g., operations) may be, for example, implemented by instructions stored in a computer-readable storage media (e.g., the memory 830) in the form of a program module. The instruction, when executed by a processor (e.g., a processor 820), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The instruction may include codes created by a compiler or codes that are capable of being executed by a computer using an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   at least one antenna;
   a wireless communication module comprising a plurality of processing circuits performing communication using the at least one antenna based on a Wi-Fi protocol; and
   one or more processors,
   wherein the one or more processors are configured to:
   determine whether the wireless communication module is simultaneously operating in a plurality of frequency bands;
   obtain a number of processing circuits that are operating in the wireless communication module if the wireless communication module is simultaneously operating in the plurality of frequency bands; and
   reduce a transmission power level of the wireless communication module based on the number of processing circuits that are operating.

2. The electronic device of claim 1, wherein the one or more processors are disposed outside the wireless communication module, and/or
   wherein at least one of the one or more processors is disposed inside the wireless communication module.

3. The electronic device of claim 1, wherein the one or more processors are configured to:
   reduce the transmission power level of the wireless communication module if the number of processing circuits that are operating exceeds a specified number.

4. The electronic device of claim 1, wherein the one or more processors are configured to:
   increase a decrement of the transmission power level as the number of processing circuits that are operating increases.

5. The electronic device of claim 1, wherein the wireless communication module further includes a cellular module comprising cellular communication circuitry, and
   wherein the one or more processors are configured to:
   verify an operating state of the cellular module;
   reduce the transmission power level to a first level if the cellular module is not in operation; and
   reduce the transmission power level to a second level lower than the first level if the cellular module is in operation.

6. The electronic device of claim 1, wherein the wireless communication module further includes a Bluetooth module comprising Bluetooth circuitry, and
   wherein the one or more processors are configured to:
   verify an operating state of the Bluetooth module;
   reduce the transmission power level to a first level if the Bluetooth module is not in operation; and
   reduce the transmission power level to a third level lower than the first level if the Bluetooth module is in operation.

7. The electronic device of claim 1, further comprising:
   a receiver; and
   a proximity sensor,
   wherein the one or more processors are configured to:
   verify at least one of an operating state of the receiver or the proximity sensor;
   reduce the transmission power level to a first level if the receiver is not in operation and/or an object is not sensed by the proximity sensor within a specified distance; and
   reduce the transmission power level to a fourth level if the receiver is in operation and the object is sensed by the proximity sensor within the specified distance.

8. The electronic device of claim 1, further comprising:
a grip sensor,
wherein the one or more processors are configured to:
verify an operating state of the grip sensor;
reduce the transmission power level to a first level if the electronic device is not gripped by a user; and
reduce the transmission power level to a fifth level if the electronic device is gripped by the user.

9. The electronic device of claim 1, further comprising:
a memory configured to store transmission power level information according to the number of processing circuits that are operating,
wherein the one or more processors are configured to:
verify the transmission power level information corresponding to the number of processing circuits; and
reduce the transmission power level based on the verified transmission power level information.

10. The electronic device of claim 8, wherein the power level information includes:
pieces of transmission power level information respectively corresponding to the plurality of processing circuits included in the wireless communication module.

11. The electronic device of claim 1, wherein the one or more processors are configured to:
determine that the wireless communication module is simultaneously operating in the plurality of frequency bands if a specified application is running.

12. A transmission power level controlling method of an electronic device, the method comprising:
determining whether a wireless communication module is simultaneously operating in a plurality of frequency bands, wherein the wireless communication module comprises a plurality of processing circuits performing communication using at least one antenna based on a Wi-Fi protocol;
obtaining a number of processing circuits that are operating in the wireless communication module if the wireless communication module is simultaneously operating in the plurality of frequency bands; and
reducing a transmission power level of the wireless communication module based on the number of processing circuits.

13. The method of claim 12, wherein the reducing of the transmission power level includes:
increasing a decrement of the transmission power level as the number of processing circuits that are operating increases.

14. The method of claim 12, further comprising:
verifying an operating state of a cellular module included in the wireless communication module,
wherein the reducing of the transmission power level includes:
reducing the transmission power level to a first level if the cellular module is not in operation; and
reducing the transmission power level to a second level lower than the first level if the cellular module is in operation.

15. The method of claim 12, further comprising:
verifying an operating state of a Bluetooth module included in the wireless communication module,
wherein the reducing of the transmission power level includes:
reducing the transmission power level to a first level if the Bluetooth module is not in operation; and
reducing the transmission power level to a third level lower than the first level if the Bluetooth module is in operation.

16. The method of claim 12, further comprising:
verifying operating states of a receiver and a proximity sensor,
wherein the reducing of the transmission power level includes:
reducing the transmission power level to a first level if the receiver is not in operation and/or an object is not sensed by the proximity sensor within a specified distance; and
reducing the transmission power level to a fourth level if the receiver is in operation and the object is sensed by the proximity sensor within the specified distance.

17. The method of claim 12, further comprising:
verifying an operating state of a grip sensor,
wherein the reducing of the transmission power level includes:
reducing the transmission power level to a first level if the electronic device is not gripped by a user; and
reducing the transmission power level to a fifth level if the electronic device is gripped by the user.

18. The method of claim 12, wherein the reducing of the transmission power level includes:
verifying transmission power level information stored in a memory and corresponding to the number of processing circuits; and
reducing the transmission power level based on the verified transmission power level information.

19. The method of claim 16, wherein the transmission power level information includes:
pieces of transmission power level information respectively corresponding to the plurality of processing circuits included in the wireless communication module.

20. An electronic device comprising:
one or more antennas;
a wireless communication module comprising a plurality of processing circuits configured to communicate based on a Wi-Fi protocol; and
one or more processors,
wherein the one or more processors are configured to:
determine whether the wireless communication module outputs first transmission power through a first frequency band and outputs second transmission power through a second frequency band using at least part of the one or more antennas;
obtain a number of processing circuits, which are operating, from among the plurality of processing circuits if the wireless communication module outputs the first transmission power and the second transmission power;
determine a first power level corresponding to the first transmission power and determine a second power level corresponding to the second transmission power, from among a plurality of transmission power levels associated with the wireless communication module based on the number of the processing circuits; and
change a power level of the first transmission power to the first power level and change a power level of the second transmission power to the second power level.

* * * * *